US008036155B2

(12) United States Patent
Gin et al.

(10) Patent No.: US 8,036,155 B2
(45) Date of Patent: *Oct. 11, 2011

(54) METHOD AND SYSTEM FOR ADAPTIVE MODULATION SCHEDULING

(75) Inventors: Alan Gin, Corona Del Mar, CA (US);
Dorothy D. Lin, Irvine, CA (US);
Jen-Chieh Chien, Lake Forest, CA (US); Rocco Brescia, Jr., Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,809

(22) Filed: May 18, 2009

(65) Prior Publication Data

US 2010/0142437 A1    Jun. 10, 2010

Related U.S. Application Data

(63) Continuation of application No. 10/823,626, filed on Apr. 14, 2004, now Pat. No. 7,535,863.

(60) Provisional application No. 60/464,117, filed on Apr. 21, 2003.

(51) Int. Cl.
*H04J 3/24* (2006.01)
*H04B 7/155* (2006.01)

(52) U.S. Cl. .......... 370/316; 455/12.1; 455/430
(58) Field of Classification Search .......... 370/230, 370/329, 349, 316, 29, 330, 332; 455/12.1, 455/427, 430, 450
See application file for complete search history.

(56) References Cited

U.S. PATENT DOCUMENTS

| 6,377,561 | B1 * | 4/2002 | Black et al. | 370/330 |
| 6,987,741 | B2 * | 1/2006 | Kelly et al. | 370/321 |
| 7,012,891 | B1 * | 3/2006 | Chandran et al. | 370/230 |
| 7,164,661 | B2 * | 1/2007 | Kelly | 370/323 |
| 7,463,582 | B2 * | 12/2008 | Kelly et al. | 370/229 |
| 7,508,785 | B2 * | 3/2009 | Dale et al. | 370/322 |
| 7,535,863 | B2 * | 5/2009 | Gin et al. | 370/316 |
| 2003/0058887 | A1 * | 3/2003 | Dworkin et al. | 370/470 |
| 2003/0061623 | A1 * | 3/2003 | Denney et al. | 725/125 |
| 2003/0067877 | A1 * | 4/2003 | Sivakumar et al. | 370/232 |
| 2004/0105403 | A1 * | 6/2004 | Lin et al. | 370/316 |

* cited by examiner

*Primary Examiner* — Blane J Jackson
(74) *Attorney, Agent, or Firm* — Sterne, Kessler, Goldstein & Fox PLLC

(57) ABSTRACT

Provided is a method and system for transmitting MPEG frames between a DOCSIS based satellite modem termination system (SMTS) and a corresponding satellite modem (SM) system. The method includes identifying at least one data stream requiring transmission between the SMTS and the SM, the data stream including one or more MPEG frames. Next, the MPEG frames are organized within SMTS data queues based upon predetermined parameters and then transmitted based upon their organization within the data queues.

15 Claims, 18 Drawing Sheets

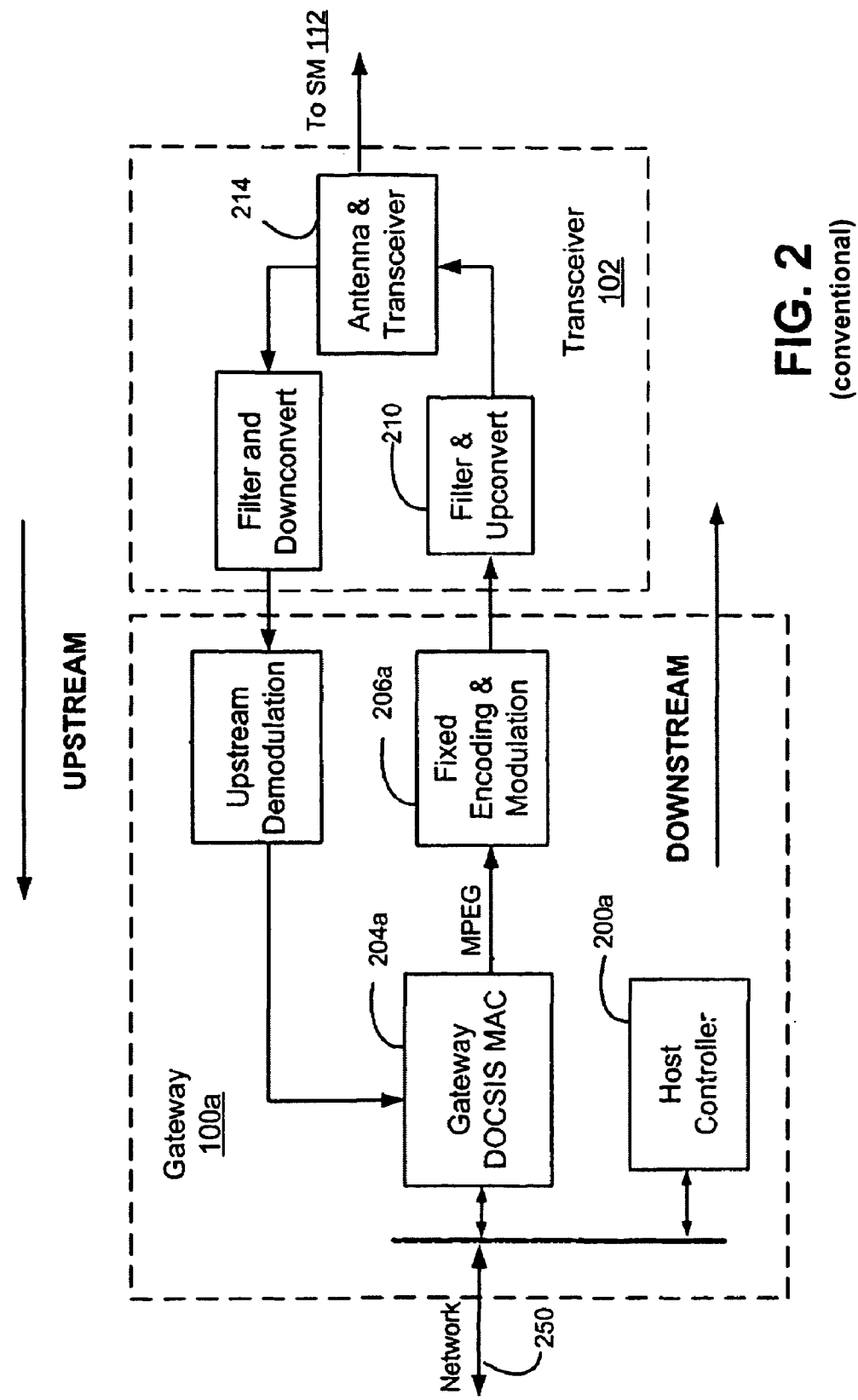
FIG. 2 (conventional)

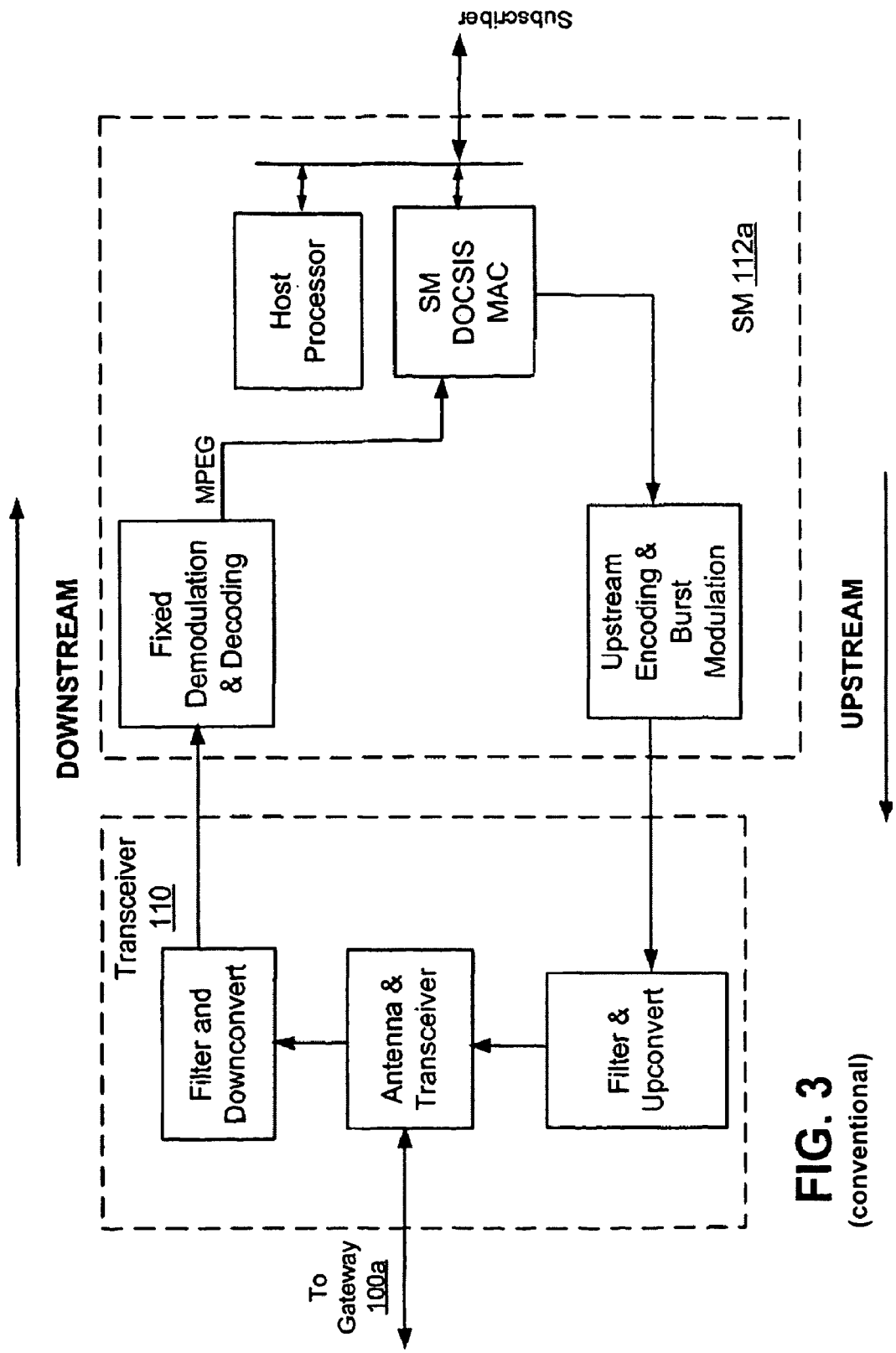
FIG. 3
(conventional)

METHOD AND SYSTEM FOR ADAPTIVE MODULATION SCHEDULING

CROSS-REFERENCE TO RELATED APPLICATIONS

This application is a continuation of U.S. Non-Provisional application Ser. No. 10/823,626, filed Apr. 14, 2004, which will issue as U.S. Pat. No. 7,535,863 on May 19, 2009, which claims the benefit of U.S. Provisional Application No. 60/464,117, filed Apr. 21, 2003, all of which are incorporated herein by reference in its entirety.

BACKGROUND OF THE INVENTION

1. Field of the Invention

The present invention is generally related to broadband communication systems. More particularly, the present invention is related to broadband communications systems that use Data Over Cable Service Interface Specification (DOCSIS) or any of its derivatives, including but not limited to a DOCSIS-compliant two-way satellite communication system. In addition, the present application is not limited to systems which utilize DOCSIS and may easily be applied to other communication system specifications and protocols that use adaptive modulation techniques (e.g., digital video broadcasting—return channel system, or DVB-RCS).

The present invention includes techniques for mapping Ethernet packets for input into a series of frames having moving pictures experts group (MPEG) frames as output. This output of MPEG frames may ultimately be used as an input to a variable encoder and modulator processing block to perform adaptive modulation. With adaptive modulation, bandwidth is increased over conventional approaches of fixed encoding and modulation implementations. When applied to a communications system such as DOCSIS, variants of DOCSIS, or DVB-RCS communication systems, adaptive modulation facilitates installation of more subscriber modems on the cable system. More subscribers ultimately translates into additional revenue.

2. Related Art

DOCSIS is a series of specifications provided by Cable-Labs (www.cablelabs.com) to define a standard for cable modem headend and modem equipment. The cable modem headend (also known as the Cable Modem Termination System, or CMTS) provides a gateway between a wide area network from a central location to a plurality of cable modems (CM's) via a hybrid/fiber coaxial (HFC) interface cable. The DOCSIS specifications define the downstream as the direction of data flow from the CMTS to the CM's and the upstream as the direction of data flow from the CM's to the CMTS. DOCSIS specifies that the downstream data flow as a broadcast of MPEG frames which can be received by all CM's. These MPEG frames may contain DOCSIS frames. The DOCSIS frames may in turn contain DOCSIS management packets or Ethernet packets.

The Ethernet packets can contain either user datagram protocol (UDP) packets, Internet protocol (IP) type packets, or potentially other types of protocol packets. DOCSIS specifies the upstream as a time-division multiple access (TDMA) method of sharing upstream bandwidth to be shared among a plurality of CM's. The unit of time used in this TDMA implementation and CM sharing is called a mini-slot. The mini-slot is a programmable length of time fixed during initialization time of the CMTS. The bandwidth of the upstream is divided among a consecutive number of these minislots to be used either by one or more multiple CM's.

DOCSIS has also been adapted to work with communication systems other than the HFC interface between the CMTS and the CM. One of these systems is a fixed wireless system, whereby the gateway is called a Wireless Access Termination System (WATS) and the modem is called a Wireless Modem (WM). Another system that has adopted DOCSIS utilizes a two-way satellite system whereby the gateway is called the Satellite Modem Termination System (SMTS) and the modem is called the Satellite Modem (SM). The present application has primarily been adapted for the SMTS but is not limited to the SMTS and may be applied to other DOCSIS variants and non-DOCSIS variant systems.

One challenge in the conventional DOCSIS approaches, however, is that all MPEG frames are transmitted between the DOCSIS based SMTS and a corresponding SM system, based upon the same transmission parameters. The limitation that all of the MPEG frames must be transmitted using the same transmission parameters prevents the SMTS from efficiently utilizing and optimizing downstream bandwidth.

What is needed, therefore, is a process that enables a communication system such as a DOCSIS based SMTS to dynamically configure downstream MPEG frame parameters. This downstream configuring preferably occurs in a manner that efficiently allocates and optimizes available downstream bandwidth.

BRIEF SUMMARY OF THE INVENTION

Consistent with the principles in the present invention as embodied and broadly described herein, the present invention provides a system and method for transmitting MPEG frames between a DOCSIS based SMTS and a corresponding SM system. The method comprises identifying at least one data stream requiring transmission between the SMTS and the SM, wherein the data stream includes one or more MPEG frames. Next the MPEG frames are organized within SMTS data queues based upon predetermined parameters. Finally, the MPEG frames are transmitted based upon their organization within the data queues.

Further features and advantages of the present invention as well as the structure and operation of various embodiments of the present invention are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and enable a person skilled in the pertinent art to make and use the invention. In the drawings:

FIG. 2 is a detailed block diagram illustration of a conventional SMTS;

FIG. 3 is an illustration of the satellite modem side of conventional upstream and downstream processing blocks;

DETAILED DESCRIPTION OF THE INVENTION

The following detailed description of the accompanying drawings illustrates exemplary embodiments consistent with the present invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware and/or the entities illustrated in the figures. Any actual software code with the specialized control hardware to implement the present invention, is not limiting of the present invention. Thus, the operation and behavior of the present invention will be described with the understanding that modifications and variations of the embodiments are possible, given the level of detail presented herein.

Figure 1:
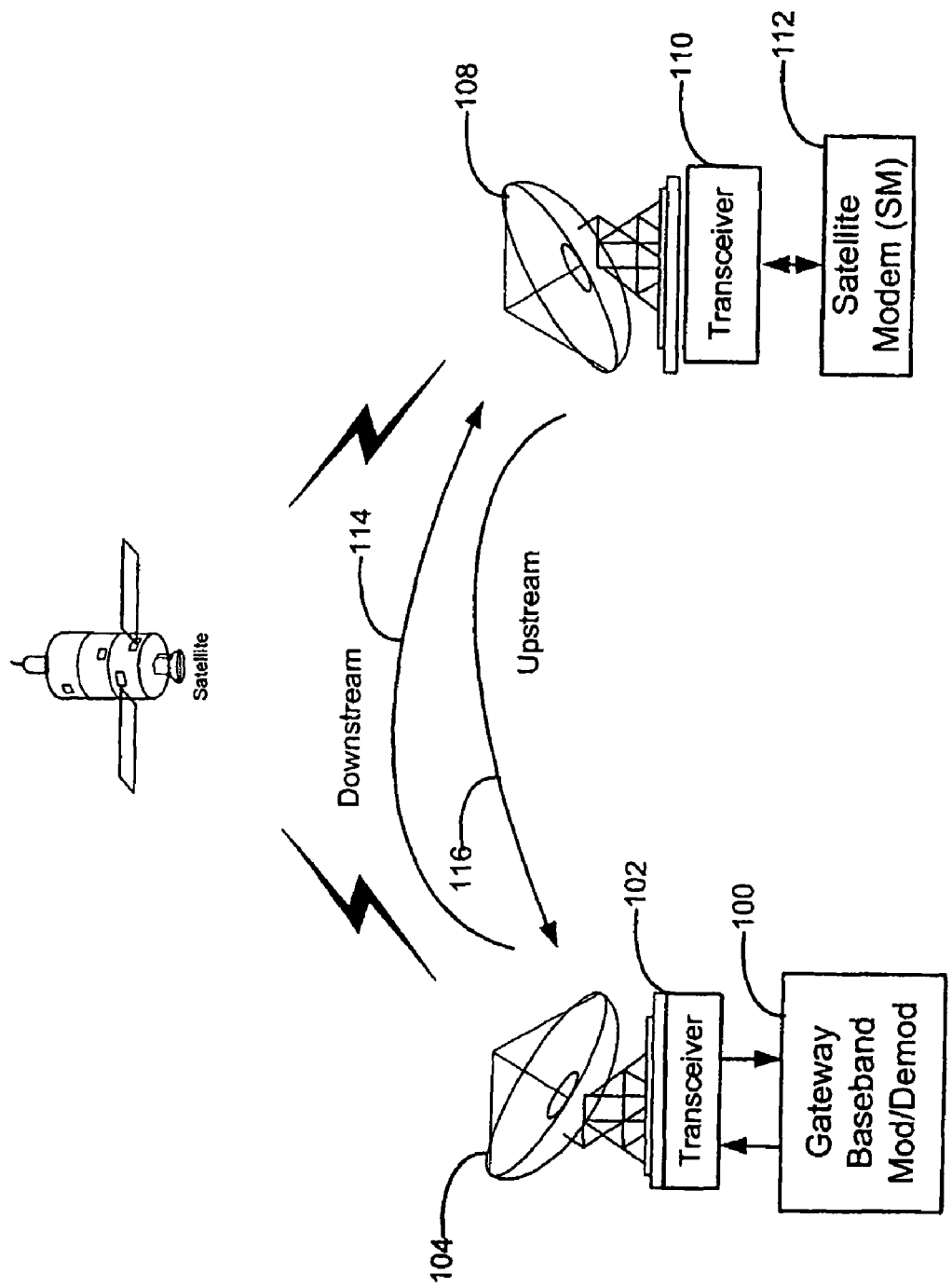
FIG. 1 is a block diagram illustration of a two-way DOCSIS based satellite system structured and arranged in accordance with an embodiment of the present invention.

FIG. 1 shows a two-way DOCSIS based satellite system. Data from a gateway 100 is sent downstream through a transceiver 102, antenna 104, uplink to satellite 106, antenna 108, and transceiver 110, to the satellite modem 112. Data from the satellite modem 112 is sent upstream through the transceiver 110, the antenna 108, the satellite 106, the antenna 104, and the transceiver 102, to the gateway 100. The techniques of the present invention are incorporated in the gateway 100.

FIG. 2 is a detailed illustration of a conventional SMTS. In FIG. 2, data from the network is received across interface 250 via a DOCSIS medium access control (MAC) 204a. Interface control is provided via a host controller 200a. This data is intended to be sent downstream via an interface 240a to a plurality of modems 112. The data is incorporated typically as IP or UDP type packets contained within an Ethernet packet. The MAC 204a formats this data by prepending the Ethernet packet with a DOCSIS header and appends a cyclic redundancy check (CRC). This DOCSIS packet is then contained within an MPEG packet with a special DOCSIS protocol identifier (PID) value to distinguish it from other types of MPEG frames.

In the conventional approach of FIG. 2, the MPEG packets are sent via the current prior art of fixed encoding and modulation 206a, filtered and upconverted via filter/upconverter 210 to a DOCSIS cable frequency and sent through an antenna/transceiver 214 and on to the plurality of SMs 112.

For convenience, FIG. 3 is presented as an illustration to show the SM side of the upstream and downstream processing blocks.

Figure 4:
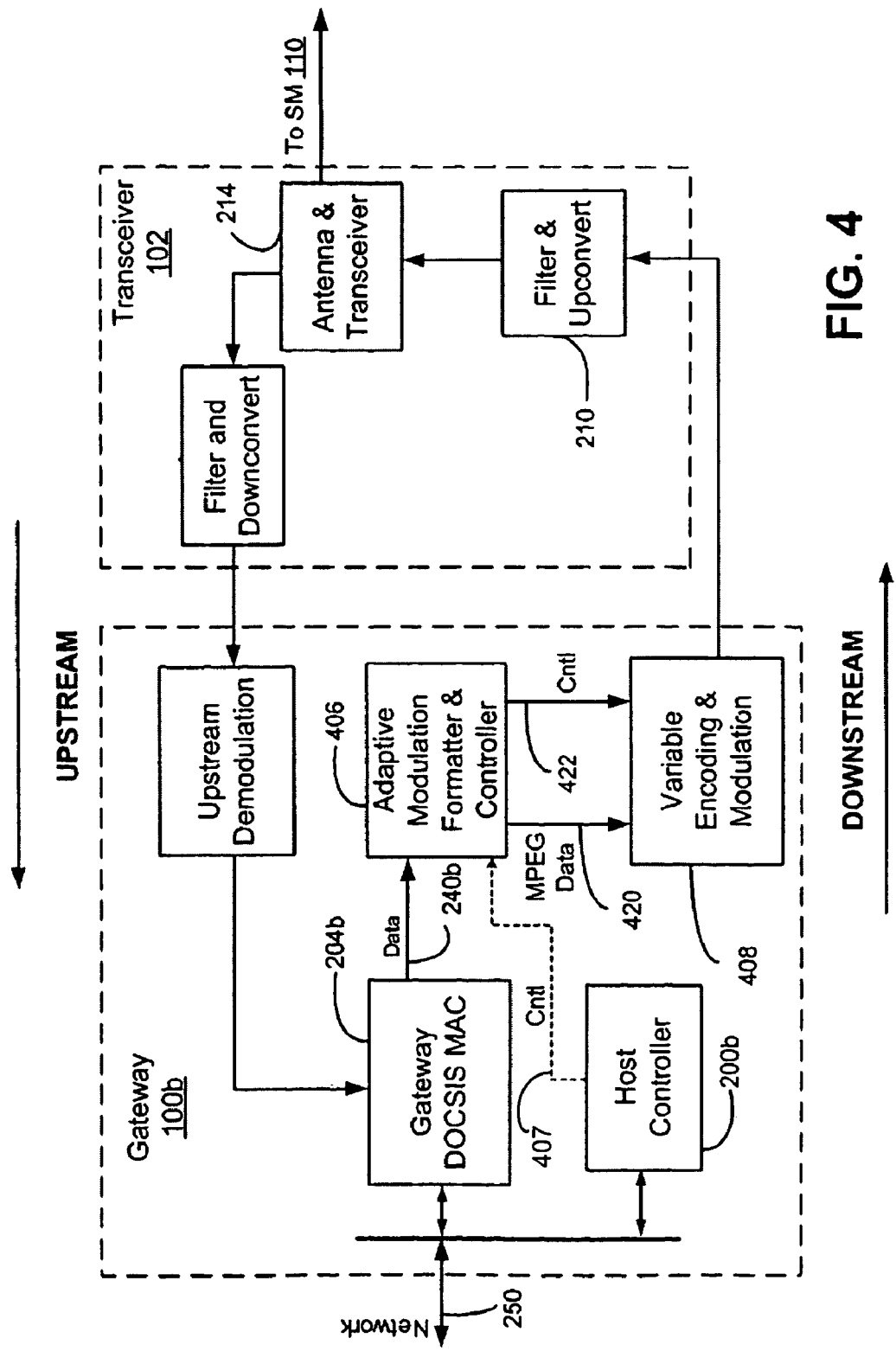
FIG. 4 is an illustration of an SMTS constructed and arranged in accordance with an embodiment of the present invention.

FIG. 4 is an illustration of an SMTS constructed and arranged in accordance with an embodiment of the present invention. Rather than pass MPEG frames from a Gateway DOCSIS MAC 204b to a fixed encoding and modulation processing block 206a, MPEG frames are passed via an Adaptive Modulation Formatter & Controller (AMFC) 406 via an interface 240b to a variable encoding and modulation processing block 408. Control for the AFMC 406 is provided by a host controller 200b via a control link 407. It is this ability to organize downstream data to subscribers who can receive at the highest rate that allows the SMTS to more efficiently utilize the downstream bandwidth that forms the basis of for the need for adaptive modulation. The present invention provides a technique to more specifically determine how the downstream data is organized by the AMFC 406.

Figure 5:
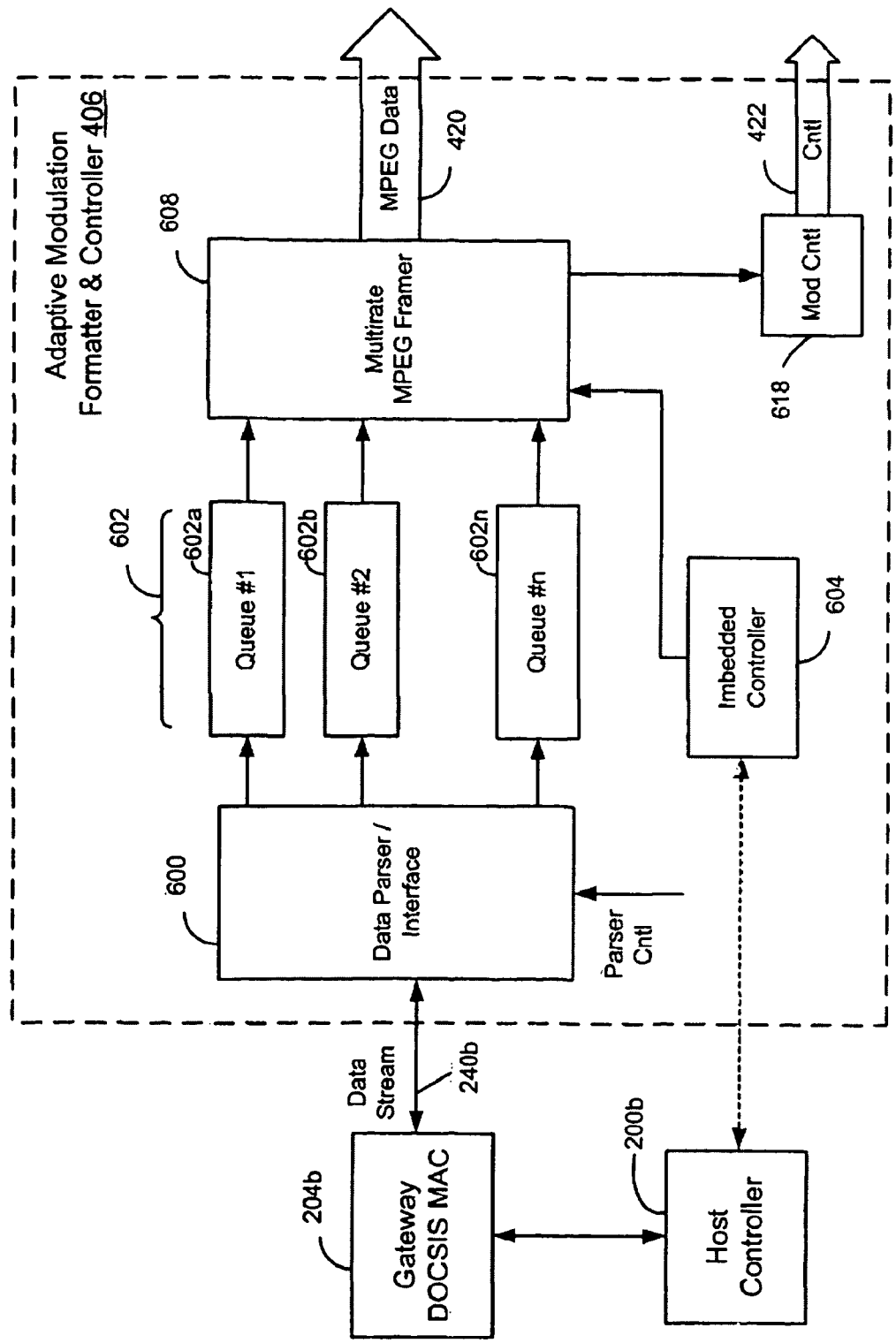
FIG. 5 is a block diagram illustration of the adaptive modulation formatter & controller shown in FIG. 4.

FIG. 5 is a block diagram illustration of the AMFC 406 shown in FIG. 4. Data is received from the Gateway DOCSIS MAC 204b not in the form of MPEG frames, as performed in the conventional approaches, but in a form of raw DOCSIS packets that are not embedded within the MPEG frames. In the conventional approaches, the MPEG frames are contained the DOCSIS packets. If the AMFC 406 were to reorganize the MPEG stream to more efficiently send to the variable encoder and modulator, it would have to strip the DOCSIS packets from the MPEG stream, reorganize the output MPEG stream, and place the DOCSIS packets into the MPEG frames.

The interface 240b simplifies this process by apriorily providing "stripped" DOCSIS packets for the AMFC 406. A data parser interface 600 sorts out the DOCSIS packets by placing the packets into queues 602 based on transmission characteristics. The data parser interface knows which queues 602a-602n to place the packets into by way of a destination address to queue mapping. This mapping may take the form of a Content Addressable Memory (CAM). This process is controlled by an embedded controller 604, as will be described in greater detail below. The controller makes the decisions as to which packets will be processed from their respective queues and sent to a Multirate MPEG framer 608 through an MPEG data interface 420. The packets will then be sent to the downstream variable encoder and modulator processing block 408. A modulation controller 618 provides mode control to the variable encoder and modulator processing block 408 via a control interface 422.

Figure 6:
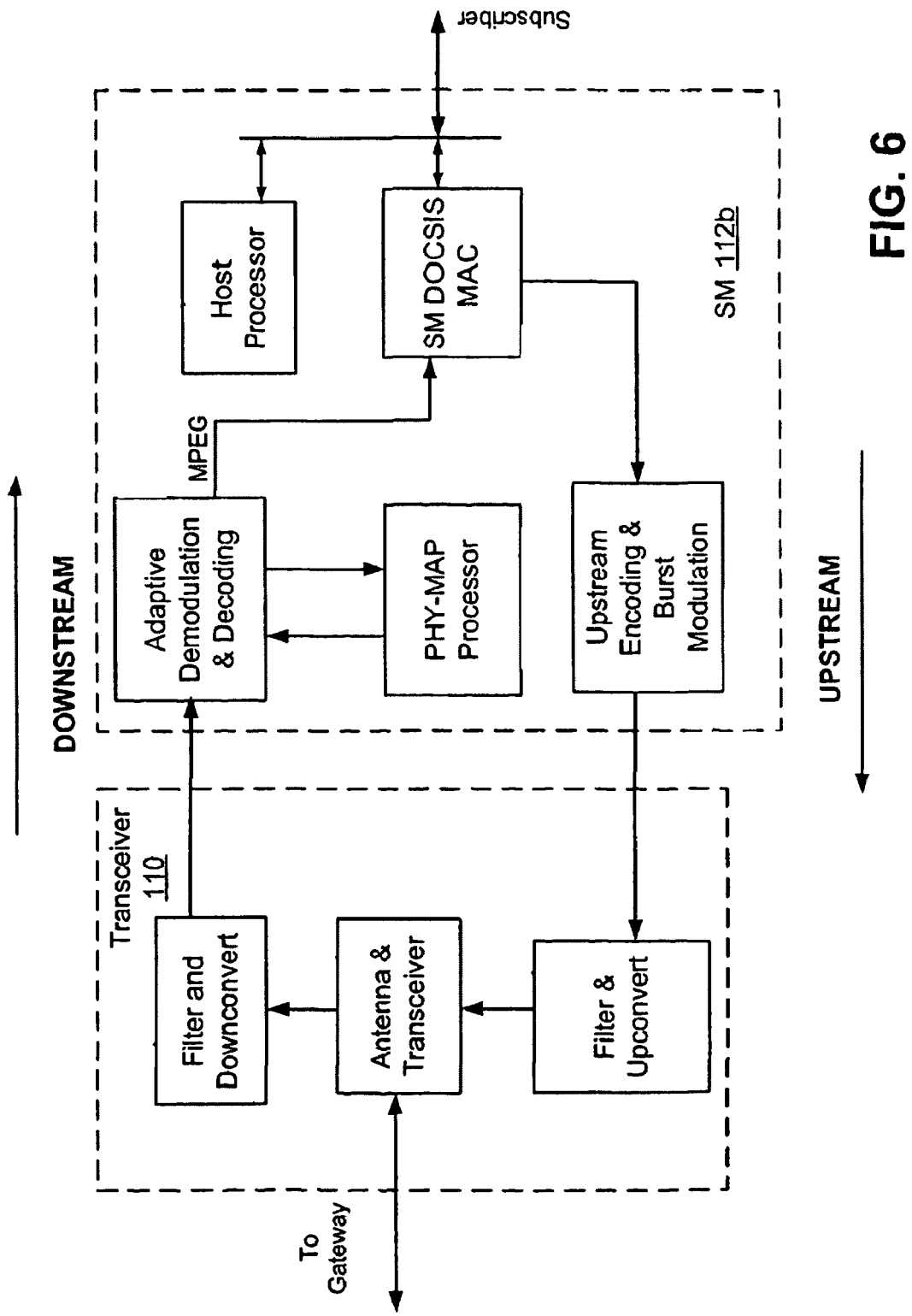
FIG. 6 is an illustration of the SM side of an adaptive modulation processing block.

FIG. 6 is an illustration depicting the SM side of an exemplary corresponding adaptive modulation processing block 112b.

Figure 7:
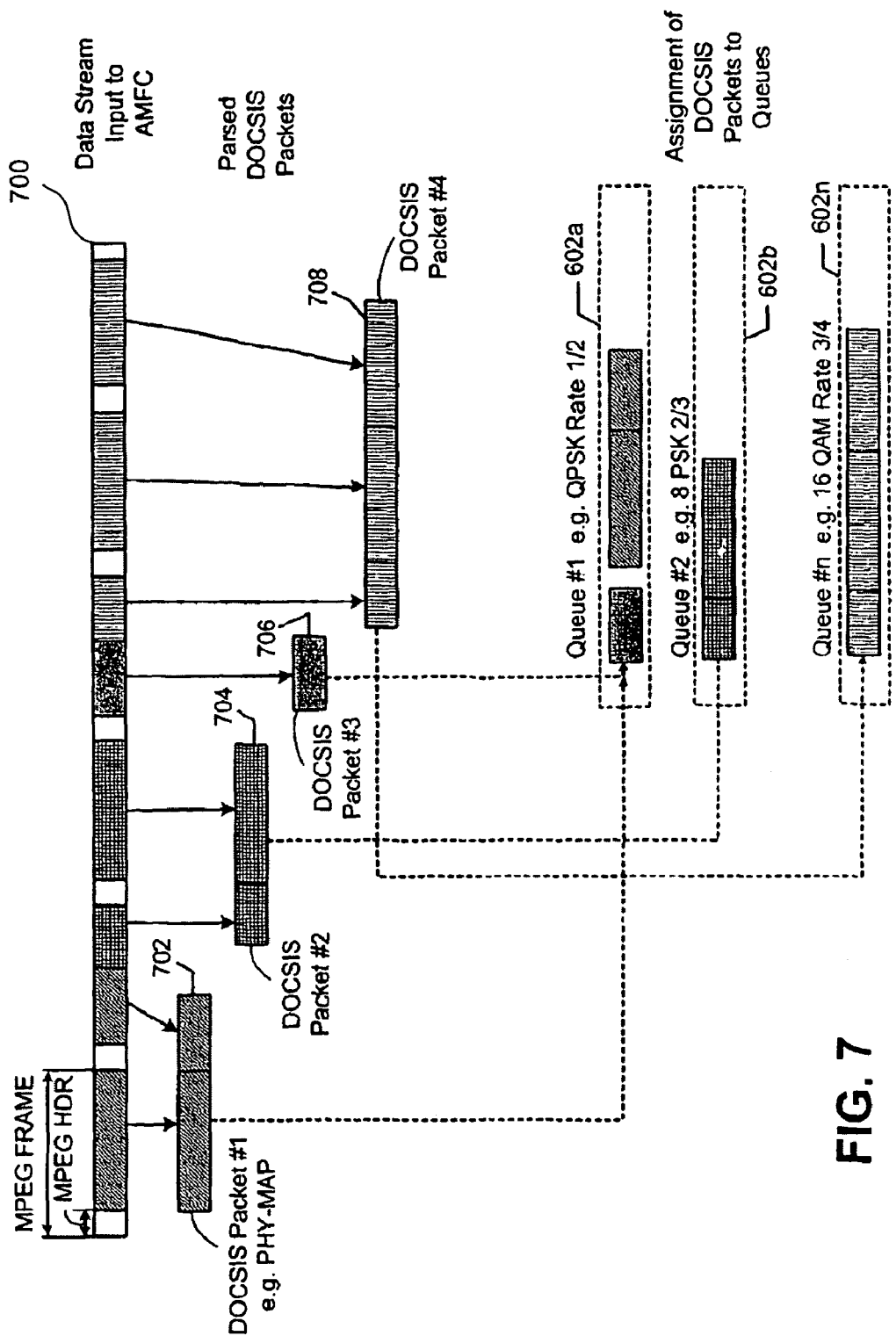
FIG. 7 is an illustration of one approach for packing DOCSIS packets into an MPEG stream.

FIG. 7 is an illustration of one exemplary approach for packing DOCSIS packets into an MPEG stream 700. This figure shows that packets 702, 704, 706, and 708 from the MPEG stream 700 be sent to different queues (602a-602n). Therefore, it is preferred that packets 702, 704, 706, and 708 they be sent with different transmission characteristics that more closely match the capability of their respective SMs. In this example, the MPEG frames within the stream 700 contain the DOCSIS packet 702 and may be sent to the queue 602a with quadrature phase-shift keying (QPSK) rate 1/2.

The MPEG frames which contain DOCSIS packet 704 can be sent to the queue 602b with 8-ary phase shift keying (8PSK) rate 2/3. Finally, the MPEG frames which contain DOCSIS packet 708 can be sent to the queue 602c with 16 quadrature amplitude modulation (QAM) rate 3/4.

Figure 8:
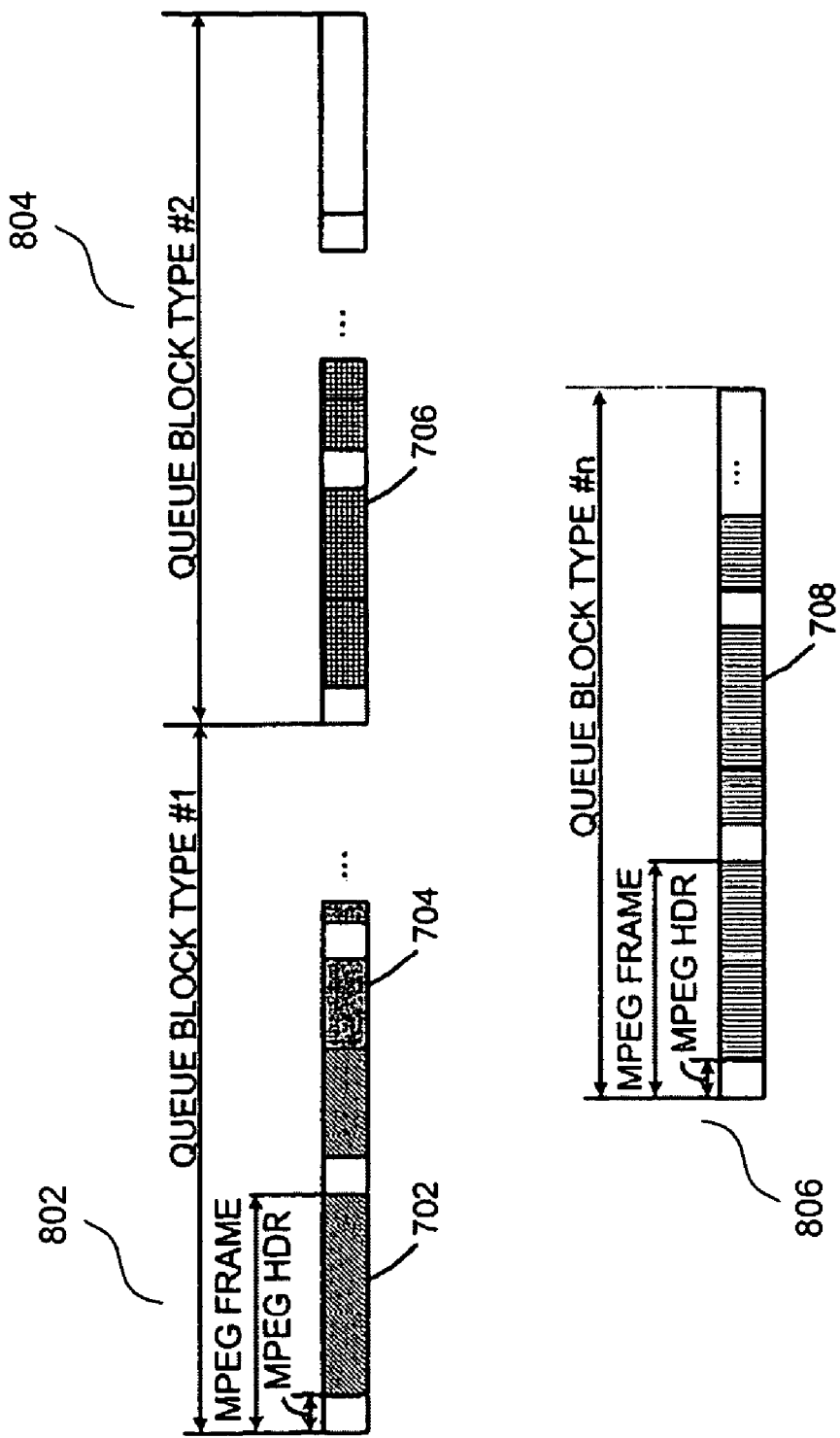
FIG. 8 is an illustration of a multi-rate MPEG stream showing an exemplary queue block structure.

FIG. 8 provides an illustration of an exemplary organization of exemplary queue blocks 802, 804, and 806. Each of the queue blocks 802, 804, and 806 includes MPEG frames that have the same transmission characteristics.

Figure 9:
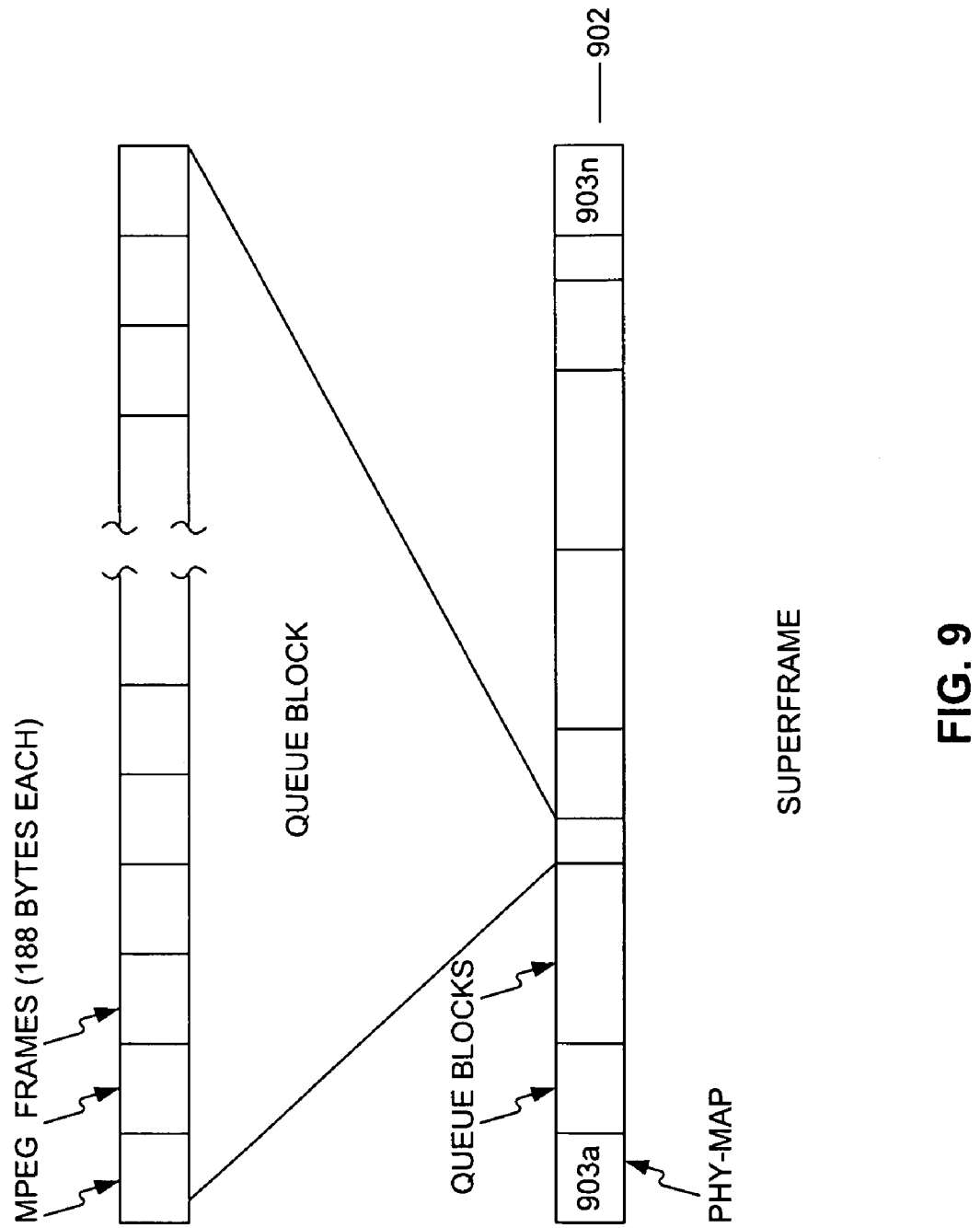
FIG. 9 is an illustration of the organization of the superframe.

FIG. 9 provides an illustration of an exemplary superframe 902. The superframe 902 is organized to include a set of queue blocks (903a-903n), each having possibly different transmission characteristics.

As noted above, the conventional techniques utilize a fixed encoding and modulation technique to transmit data downstream from an SMTS to a plurality of SM's. The present invention, however, provides techniques to organize data in order to vary encoding and modulation technique to optimize data transmitted downstream from an SMTS to a plurality of SM's. It is the ability to transmit with variable encoding and modulation characteristics (i.e., modulation, forward error correction (FEC) code rate, FEC block size, etc.,) which allows more SM's to transmit more efficiently, thus maximizing the downstream bandwidth.

The maximizing of the downstream bandwidth allows the satellite operator to increase the number of SM's that can be supported on a single downstream channel. The present invention provides techniques to be performed on the input data stream of DOCSIS MAC frames to the AMFC. These DOCSIS MAC Frames may contain DOCSIS MAC management messages or data protocol data units (PDUs). These data PDUs may further contain Ethernet packets. Finally, these Ethernet packets may contain IP packets or UDP packets. The resultant output of this mapping is an MPEG data stream which may be input to a variable encoding and modulation processing block.

There are various techniques for mapping the input data stream of DOCSIS MAC Frames onto an output MPEG data stream. It is assumed first that the input data stream may be organized into input queues as previously described. These queues, such as the queues 602a-602n, are characterized by their associated transmission parameters such as modulation, FEC type, FEC rate, FEC block size, and queue block (QB) size, with which they are associated. It is assumed for the sake of simplicity that a particular queue may further be characterized, for example, by it's signal-to-noise (SNR) requirements. If one queue requires more SNR than another queue, it should be considered a less robust queue or, alternatively, a higher rate queue. For the purpose of further discussion, queues will be classified in either of these manners.

The present invention covers the organization of the QBs that form a superframe. To summarize, a QB (see FIG. 9) is a set of MPEG frames (e.g., 903a-903n) that have the same transmission parameters. The number of MPEG frames which make up a QB is arbitrary and can range from as little as one to as many as several hundred. Various factors must be taken into consideration as to how many MPEG frames comprise a QB. Some of these factors include an inner code block (e.g., turbocode) size, an outer code (Reed-Solomon) block size, interleaver size, latency, etc. A superframe (see FIG. 9) may contain any combination and number of these queue blocks.

The organization of a superframe, such as the superframe 902, can vary widely. The queue blocks can be organized from lowest rate to highest rate. The queue blocks can also be organized from highest rate to lowest rate. Alternatively, for example, the order of queue blocks may be ordered based on queue priority. This priority may be based on loading (i.e., how much data is present in a particular queue) or pre-determined (i.e., during initialization). Note that each of these schemes may involve repeating the scheme many times within the superframe. Assume in all drawings that queue blocks are labeled with a number indicating it's respective rate. For example, QB 0 is a lower rate than QB 4 and therefore QB 0 is more robust than QB 4.

There are several ways which queue blocks may be organized in a superframe:

1. Lowest to Highest Rate Order (L2HRO)

Figure 10:
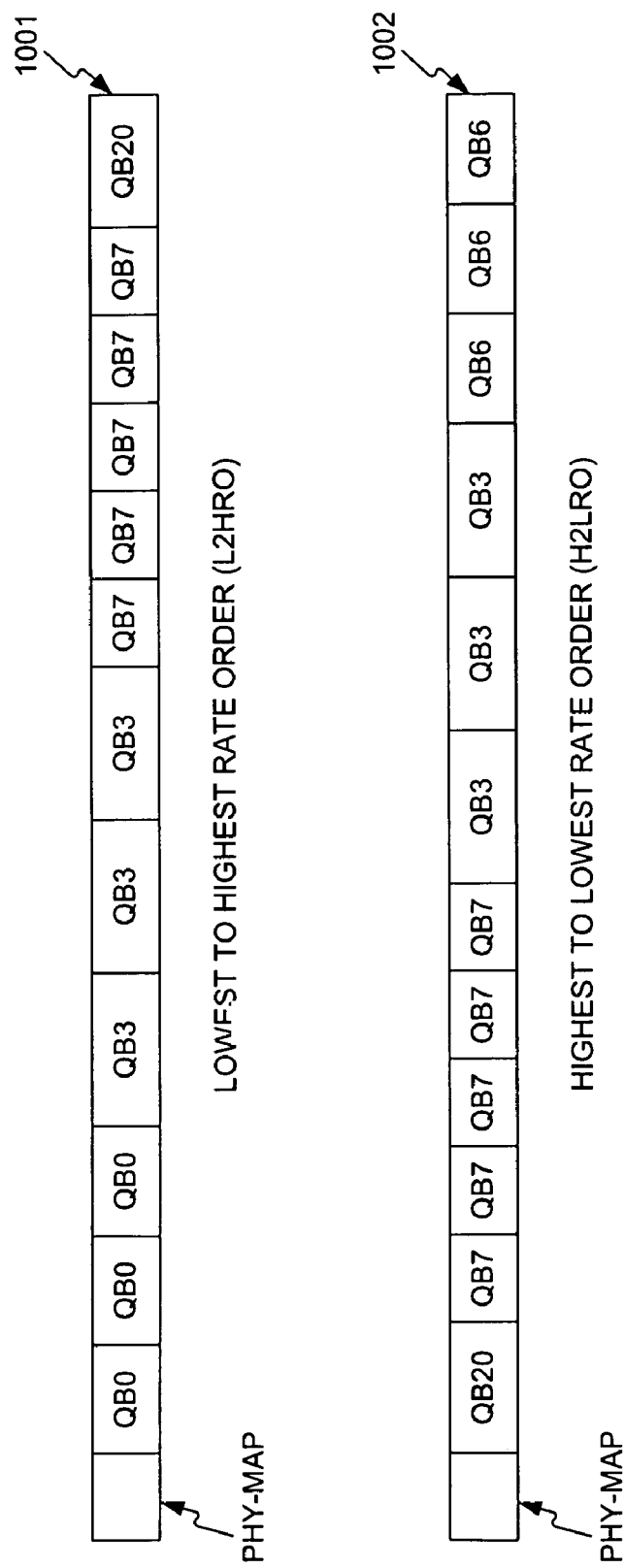
FIG. 10 is an illustration of queue block organization in accordance with a first and second embodiment of the present invention.

FIG. 10 provides an illustration to indicated that queue blocks can be allocated according to data present in queues, such as an exemplary queue 1001. The process starts from the lowest rate queue. If data is present in a queue, one can allocate the queue block in the current superframe and empty out the queue's DOCSIS packets into this queue block. If there is more data in the queue that can fit in the current queue block, allocate another queue block of this type. When there is no more data in the queue, go to the next higher rate queue. If there is data in this queue, empty out this queue's DOCSIS packets into this queue block.

The process of putting this higher rate data in a lower rate queue block is called "backfilling". If there is more data in the queue that can fit in the current queue block, allocate a new queue block of this particular queue's type. Note that this queue block will usually be of a higher rate than the previous queue block. Continue with this process until there are no more data in any of the queues. Or, if a predetermined maximum superframe size is reached. An alternative method is to have each queue be assigned a maximum number of queue blocks. When this maximum number of queue blocks is reached, stop processing data for this particular queue and start processing the next queue.

If enough queue blocks are allocated than an arbitrary limit (e.g., maximum superframe size is reached), stop the process and send the superframe to the modulator. Note that if the maximum superframe size is reached, one has three options: 1) start the next superframe with the lowest rate queue again; 2) start the next superframe with the same queue we left off with when we reached the maximum superframe size; 3) start the next superframe with the next higher rate queue we left off with when we reached the maximum superframe size. If the maximum SF size was not reached, we can start the next superframe with the lowest rate queue again.

2. Highest to Lowest Rate Order (H2LRO)

This process is similar to the above technique except that the order of processing queues is from highest rate to lowest rate. Refer to element 1002 within FIG. 10.

3. Highest to Lowest Priority Order (H2LPO)

Figure 11:
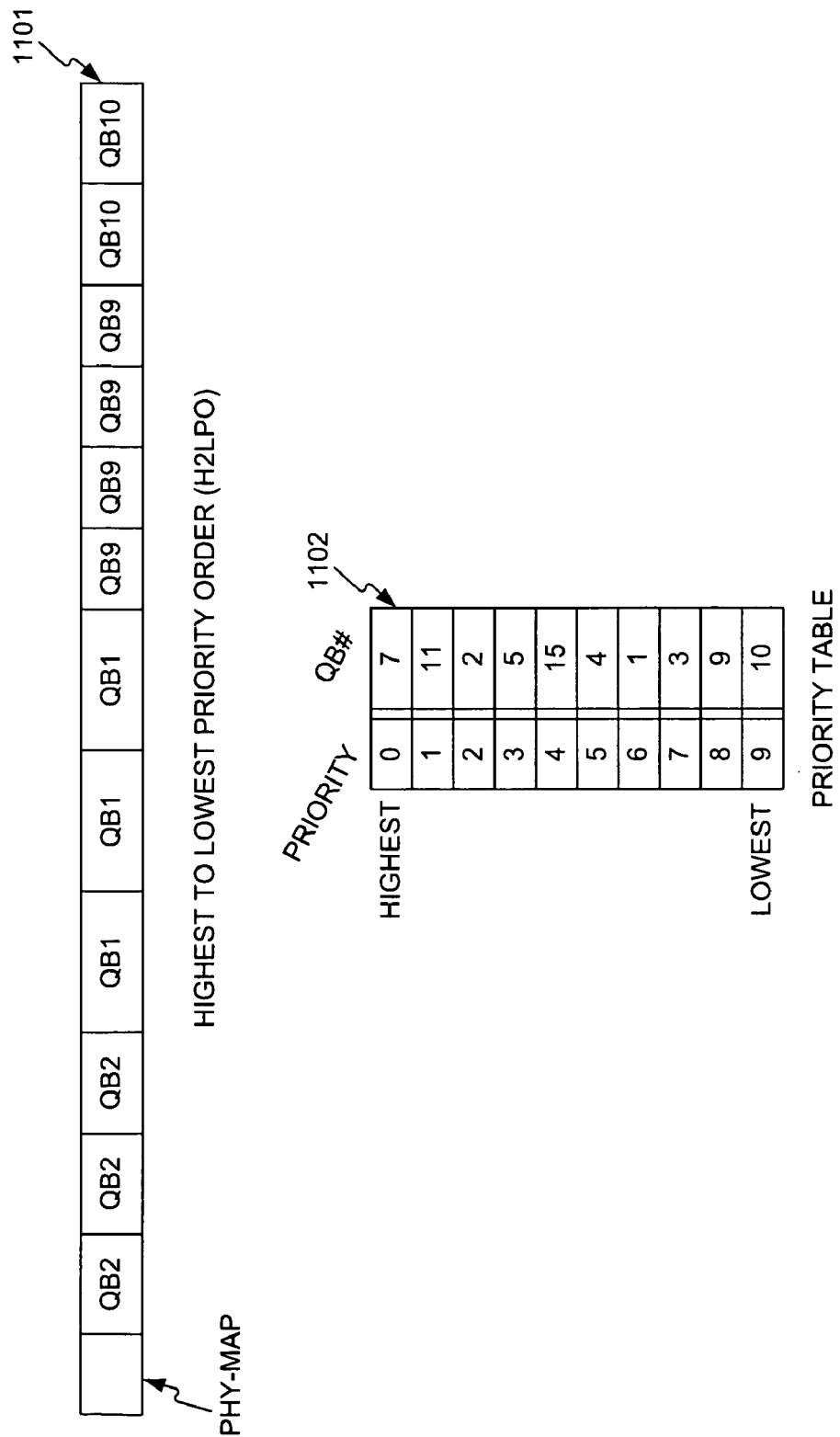
FIG. 11 is an illustration of queue block organization in accordance with a third and fourth embodiment of the present invention.

FIG. 11 provides an exemplary illustration of the highest to lowest priority order process. This approach is similar to the above technique except that the order of processing queues is determined by assigning each queue a priority level. A queue 1101 with a higher priority level will be allowed to entirely empty its queue before moving on to the next queue in terms of priority. A priority table 1102 mapping queues to priorities may be used, as shown in FIG. 11.

4. Lowest to Highest Rate Order—Round Robin (L2HRO-RR)

Figure 12:
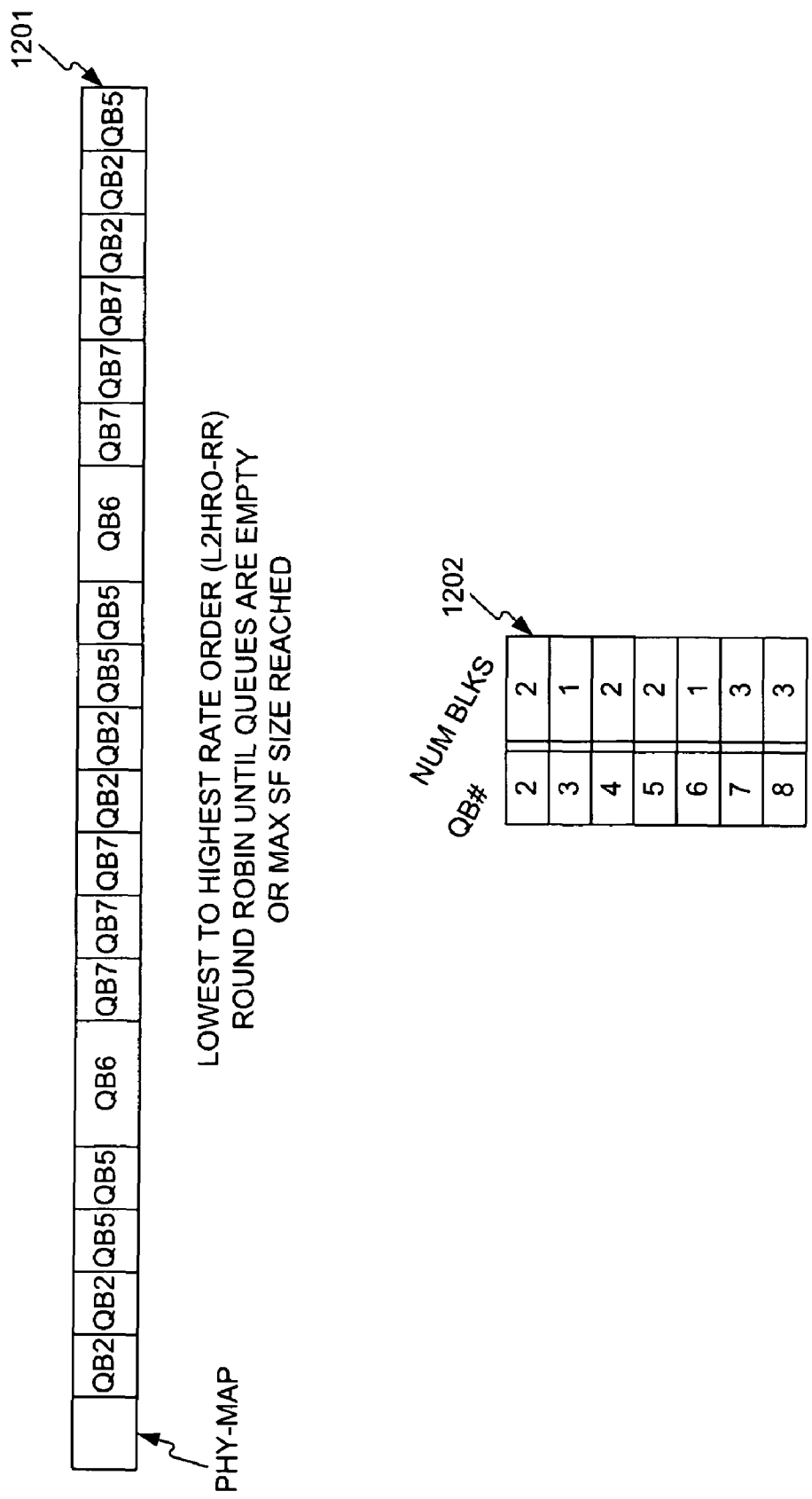
FIG. 12 is an illustration of queue block organization in accordance with a fifth embodiment of the present invention.

FIG. 12 provides an exemplary illustration of the lowest to highest rate order process. This approach is similar to the techniques above except that rather than process a queue, such as a queue 1201, until all of its data has been read out, read out enough data so that can fit in a maximum number of queue blocks. Then move on to the next queue, backfilling when necessary. This technique ensures that in a heavily loaded condition, all queues have a chance to process some amount of data. If all of the queues have been serviced and the maximum SF size was not reached, start at the beginning again. Continue until either 1) all of the data has been read out of all the queues, 2) the maximum SF size was reached, 3) there is no more time to continue the search. A table 1202 relating queue number to number of queue blocks may be used, as shown in FIG. 12.

5. Highest to Lowest Rate Order—Round Robin (H2LRO-RR)

Figure 13:
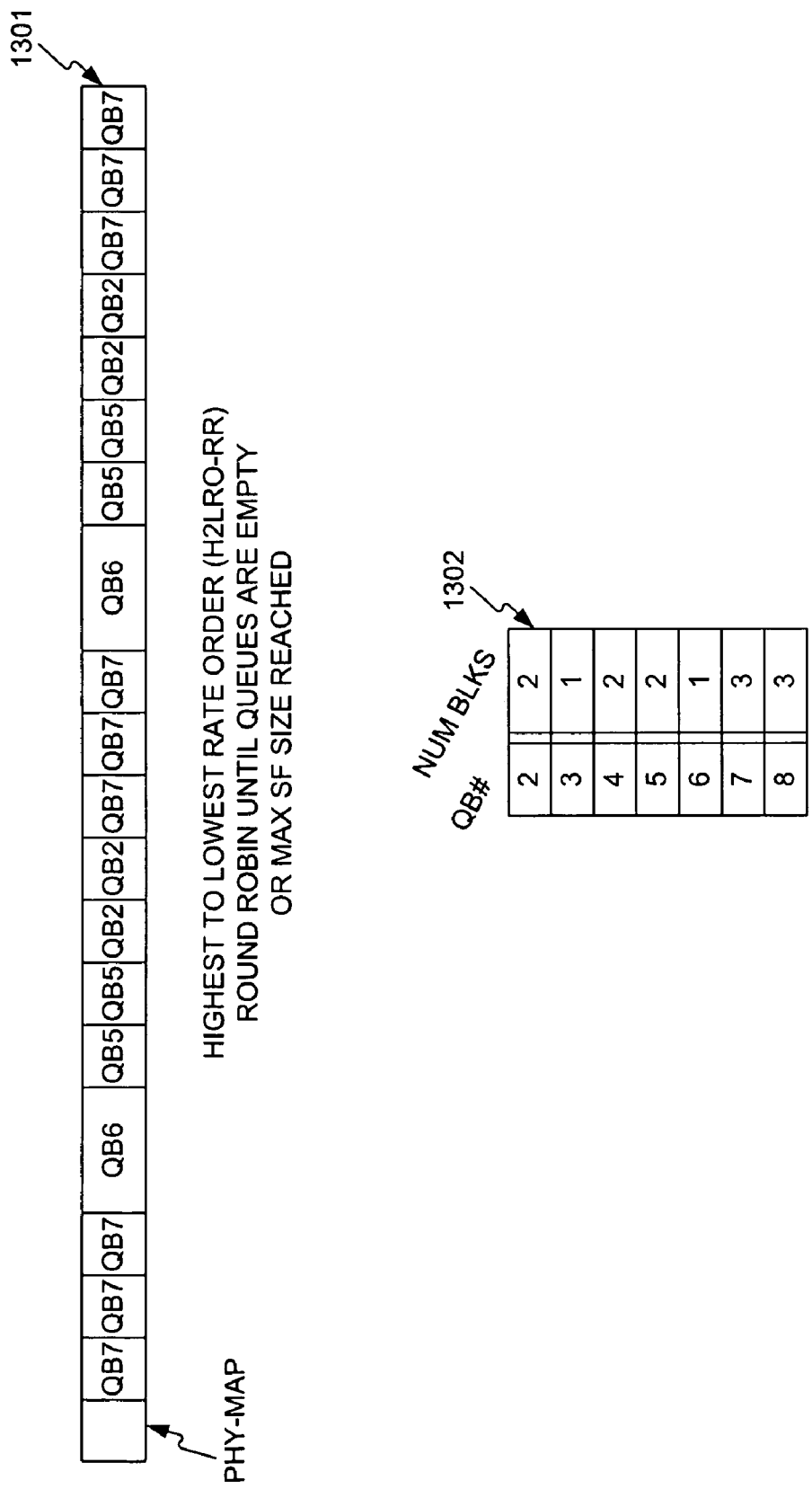
FIG. 13 is an illustration of queue block organization in accordance with a sixth embodiment of the present invention.

FIG. 13 provides an exemplary illustration of processing queues from highest to lowest rate. This approach is similar to the above technique except that the order of processing queues is from highest rate to lowest rate. A table 1302 relating queue number to number of queue blocks may be used.

6. Highest to Lowest Priority Order—Round Robin (H2LPO-RR)

Figure 14:
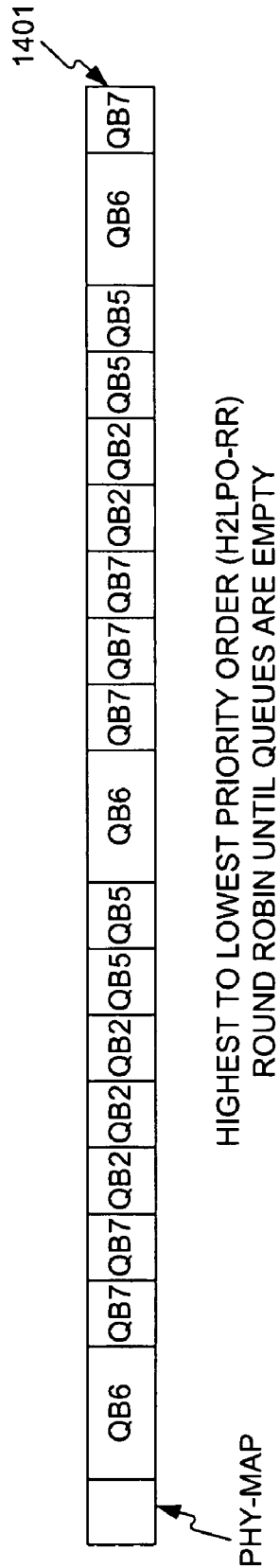
FIG. 14 is an illustration of queue block organization in accordance with a seventh embodiment of the present invention.
Figure 15:
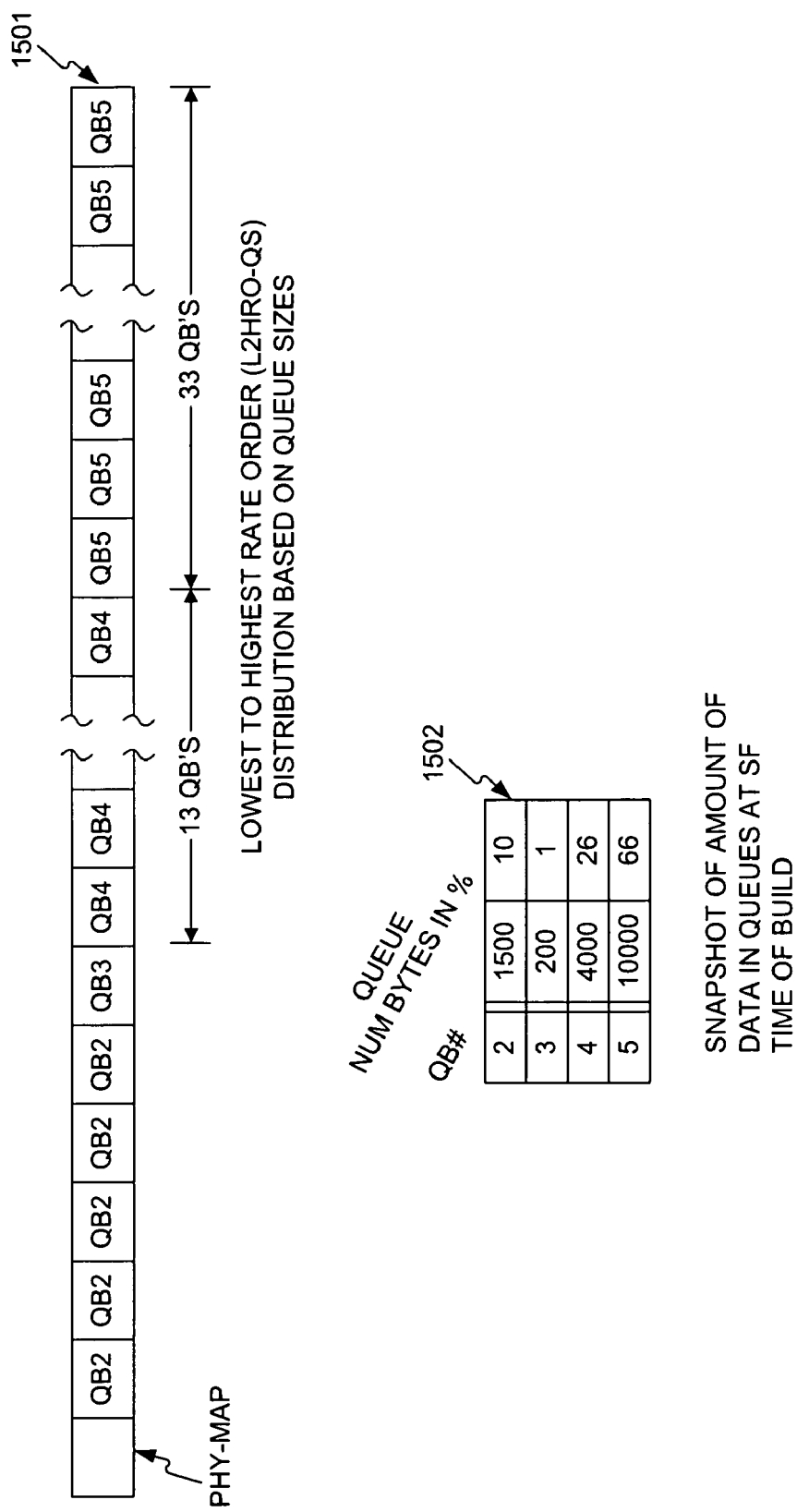
FIG. 15 is an illustration of queue block organization in accordance with a eighth embodiment of the present invention.
Figure 16:
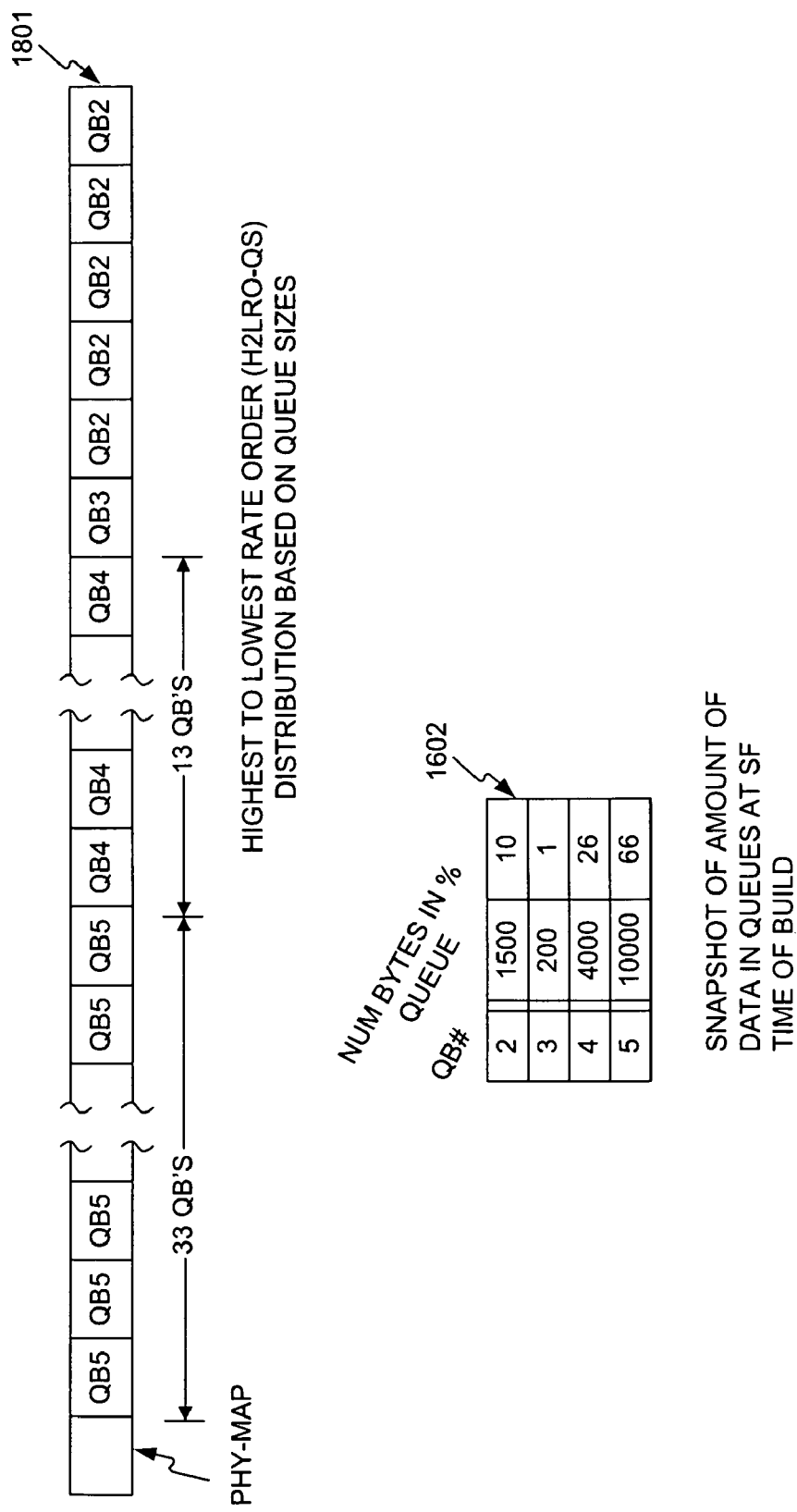
FIG. 16 is an illustration of queue block organization in accordance with a ninth embodiment of the present invention.

FIG. 14 provides an exemplary illustration of processing queues from highest to lowest priority order. This approach is similar to above technique except that the order of processing queues, such as the queue 1401, is from highest to lowest priority. Refer to FIG. 14. A table 1402 relating queue number to number of queue blocks may be used.

7. Lowest To Highest Rate Order—Queue Sizes (L2HRO-QS)

This approach comes into play under heavy loading conditions. The amount of data from each queue, such as a queue 1501, will be determined based on the relative amount of data in a particular queue when compared with the total amount of data from all of the queues. Under heavy loading conditions, it's difficult to read all of the data out of the queues and place it in a superframe with a maximum size. Therefore, a fair approach to retrieve an amount of data less than the total data in the queue must be used. This fairness may be as simple modified to include assigning 'weights' to queues such that some queues may have higher priorities over other queues, resulting in more or less data than in a strictly proportional approach. The sequence of queue blocks in this type of superframe may be from lowest to highest rate. A snapshot of data obtained when it is time to build the superframe may resemble table 1502.

8. Highest to Lowest Rate Order—Queue Sizes (H2LRO-QS)

This is similar to the above technique except that the sequence of queue blocks, such as the queue blocks in a queue 1601, in this type of superframe may be from highest to lowest rate. A snapshot of amount of data in queues at superframe time of build may resemble table 1602.

9. High to Low Rate Queue Block (H2LRQB) Transition

Figure 17:
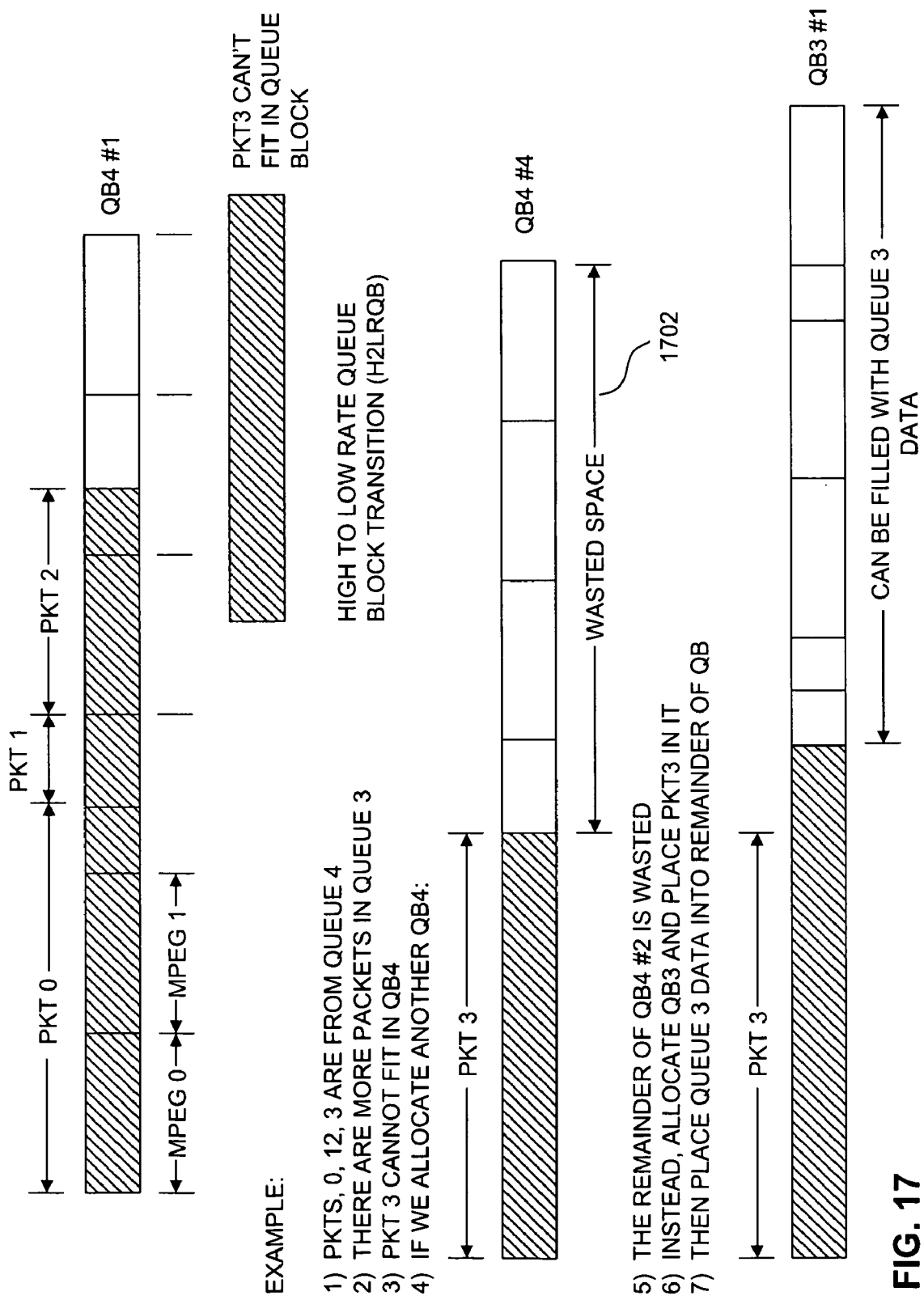
FIG. 17 is an illustration of how to handle high to low rate queue block transitions.

FIG. 17 provides an exemplary illustration of high to low rate queue block transitioning. Data packets, such as PKT3, from a high rate queue can often overflow the current queue block, such as a queue block QB4#1, in a superframe. When this happens, however, these data packets might not completely fill another queue block if another one is allocated. As a result, a decision can be made as to whether the queue block QB3#1 should be allocated. This is because if the only data remaining from other queues are lower rate, allocating another high rate queue block, such as QB4#2, will have to result in wasted space 1702 because low rate modems will not be able to see low rate data packets placed in the space left over in the high rate queue block.

Of course, this problem is minimized if data from other queues are higher rate because we can always backfill higher rate data in lower rate queue blocks. So the H2LRQB techniques specifies that one option is to fill the rest of the high rate queue block, allocate a low rate queue block, fill the rest of the high rate packet data into the low rate queue block. Then move on to the low rate queue and place the low rate packet data in the remainder of the low rate queue block. As one can see, this problem occurs if organizing queue blocks in a superframe in a high to low rate order. So minimizing this type of transition reduces the need to utilize this approach.

As noted above, The conventional systems are illustrated in FIGS. 2 and 3 whereby a two-way satellite system utilizes a fixed encoding and modulation processing block at the satellite gateway and a fixed decoding and demodulation processing block at the satellite modem. FIG. 1 shows the overall system of the prior art which is also applies to the invention that this patent will utilize.

Advantages of the various techniques of the present invention are as follows:

1. Lowest to Highest Rate Order (L2HRO)

This technique is one of the simplest approaches to implement. The ability to backfill high-rate data into empty low-rate queue blocks provides an advantage over the HTLRO approach.

2. Highest to Lowest Rate Order (H2LRO)

This approach provides a way to give higher rate queues priority over lower rate queues.

3. Highest to Lowest Priority Order (H2LPO)

This approach allows queues to be assigned individual priorities. The searching order or the queues are based on this priority. So in fact, if it is desired, some low rate queues may have priority over some high rate queues.

4. Lowest to Highest Rate Order Round Robin (L2HRO-RR)

The advantage of this technique is the ability to have a single approach handle lightly loaded and heavily loaded superframes. During lightly loaded conditions, all data will be processed from all the queues and placed in the superframe. During heavily loaded conditions, data is read out from each queue with the amount decided by whether all queues have equal priority. An equal priority may mean that each queue is allowed to empty out enough data to fill the same number of queue blocks during each "pass" through the queues.

An unequal priority may mean that each queue is allowed to empty out enough data to fill an unequal number of queue blocks during each "pass" through the queues. This unequal number of queue blocks determines to what level each queue has in terms of priority relative to the other queues. Another advantage of this approach is that there is no determination ahead of time as to which queues have what amount of data. The technique "blindly" processes each queue based on the queue blocks it has available to fill. Having to determine ahead of time the total amount of data in each queue takes up valuable central processing unit (CPU) time and in a simple implementation of the AMFC controller, it may be more desirable to have a simple assembly language or microcode CPU which does not have sophisticated mathematical support.

5. Highest to Lowest Rate Order (H2LRO-RR)

This technique is similar to L2HRO-RR except that the H2LRQB technique must be used in order to more efficiently pack data when each high to low rate queue block transition is encountered. The advantage is that this approach gives higher rate data a slightly higher priority over lower rate data, assuming that each queue has been given the same priority in terms of the number of queue blocks allowed for each "pass".

6. Highest to Lowest Priority order—Round Robin (H2LPO-RR)

This technique is similar to L2HRO-RR and H2LPO-RR except that each queue is searched in order of a preassigned priority. Like the L2HRO-RR and H2LPO-RR techniques, each queue may also pre-determine an equal or unequal number of queue blocks so that queues are prioritized when the data is emptied out. The advantage is full flexibility in terms of queue priority.

7. Lowest To Highest Rate Order—Queue Sizes (L2HRO-QS)—Distribution Based on Queue Sizes This technique allows a way to determine prior to building the superframe the number of queue blocks each queue is allowed. During lightly loaded conditions, this approach will schedule all data in the superframe. During heavily loaded conditions, this approach will schedule some data, based on the amount of data in each queue and whether queues have equal "weight". The advantage is that the AMFC will be able to better distribute out the data in the superframe such that certain queues will not appear to be "starved".

8. Highest to Lowest Rate Order—Queue Sizes (H2LRO-QS)

This technique is similar to L2HRO-QS except that the H2LRQB is preferably used in order to more efficiently pack data when each high to low rate queue block transition is encountered.

Figure 18:
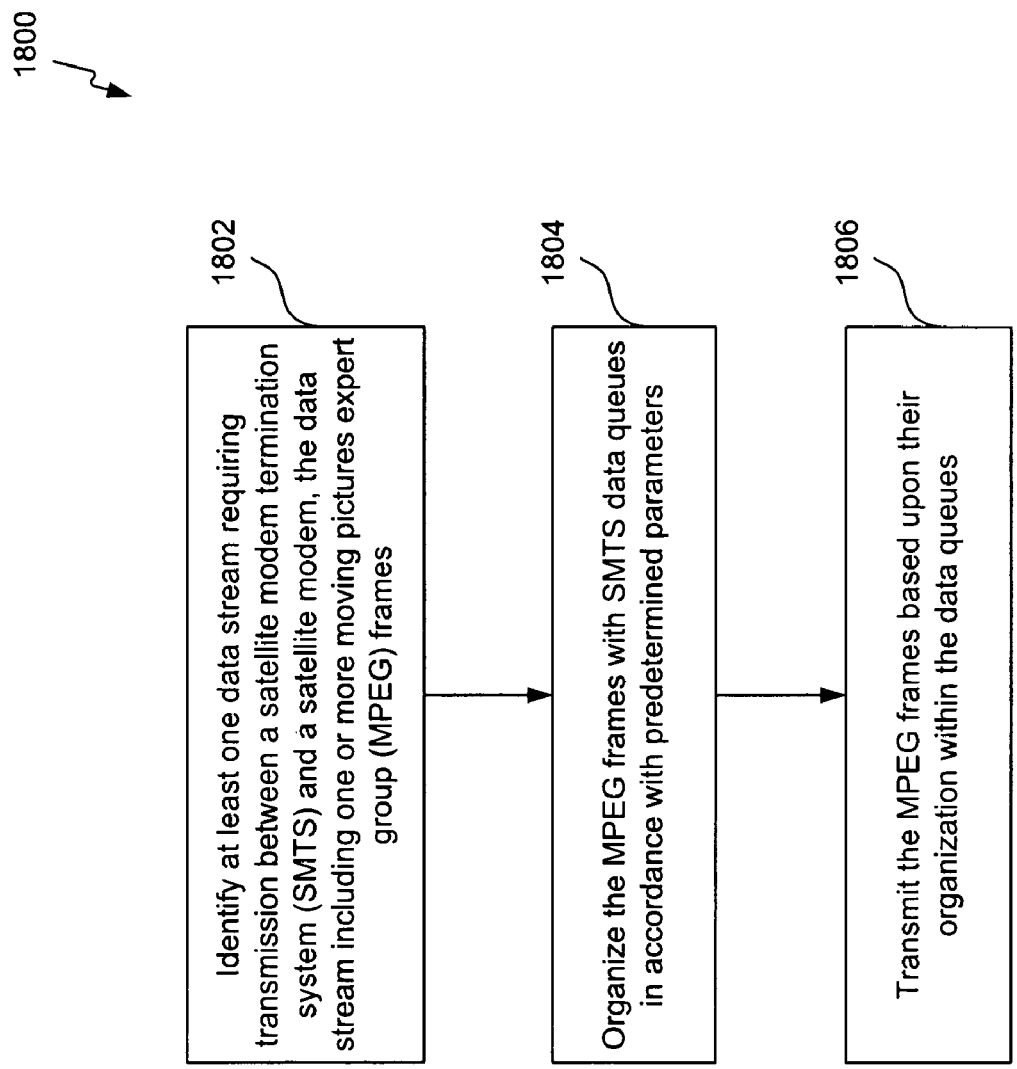
FIG. 18 is a flow chart of an exemplary method of practicing an embodiment of the present invention.

FIG. 18 is a flow chart of an exemplary method 1800 of practicing an embodiment of the present invention. In FIG. 18 at least one data stream requiring transmission between an SMTS and an SM is identified, as indicated in a step 1802. The data stream includes one or MPEG frames. In step 1804, the MPEG frames are organized within the SMTS data queues in accordance with predetermined parameters. The MPEG frames are then transmitted based upon their organization within the data queues, as indicated in a step 1806.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of he present specification is to be interpreted by the skilled artisan in light of the teachings and guidance presented herein, in combination of one of ordinary skill in the art.

What is claimed is:

1. A method for transmitting moving pictures experts group (MPEG) frames between a satellite modem termination system (SMTS) and a corresponding satellite modem (SM) system, the method comprising:
   organizing MPEG frames within SMTS data queues in accordance with predetermined parameters, the MPEG frames being included in a data stream requiring transmission between the SMTS and the SM; and
   transmitting the MPEG frames based upon their organization within the data queues.

2. The method of claim 1, further comprising associating the transmitted frames with the predetermined parameters.

3. The method of claim 1, wherein the organizing includes processing the data queues based upon predetermined priorities.

4. The method of claim 3, wherein the predetermined priorities include at least one from group including (i) a highest to lowest rate order, (ii) a highest to lowest priority order, and (iii) a lowest to highest rate order.

5. The method of claim 1, wherein the organizing is based upon destination address to queue mapping.

6. The method of claim 1, wherein the predetermined parameters include at least one from the group including forward error correction rate, modulation type, and signal to noise ratio.

7. The method of claim 6, wherein the predetermined parameters are associated with downlink transmissions.

8. An apparatus for transmitting moving pictures experts group (MPEG) frames between a data over cable services interface specification (DOCSIS) based satellite modem termination system (SMTS) and a corresponding satellite modem (SM) system, the apparatus comprising:
   means for identifying at least one data stream requiring transmission between the SMTS and the SM, the data stream including one or more MPEG frames;
   means for organizing the MPEG frames within SMTS data queues in accordance with predetermined parameters; and
   means for transmitting the MPEG frames based upon their organization within the data queues.

9. The apparatus of claim 8, further comprising means for associating the transmitted frames with the predetermined parameters.

10. The apparatus of claim 8, wherein the means for organizing includes assessing queue block priorities.

11. The apparatus of claim 8, wherein the predetermined priorities include at least one from group including (i) a highest to lowest rate order, (ii) a highest to lowest priority order, and (iii) a lowest to highest rate order.

12. The apparatus of claim 8, wherein the means for organizing is based upon destination address to queue mapping.

13. The apparatus of claim 12, wherein the mapping includes a content addressable memory scheme.

14. The apparatus of claim 8, wherein the predetermined parameters include at least one from the group including forward error correction rate, modulation type, and signal to noise ratio.

15. The apparatus of claim 14, wherein the predetermined parameters are associated with downlink transmissions.

* * * * *